US012711712B2

(12) United States Patent
Tucker

(10) Patent No.: US 12,711,712 B2
(45) Date of Patent: Aug. 18, 2026

(54) SYSTEM AND METHOD FOR PROVIDING A DISPLAY SCREEN IN AUGMENTED REALITY

(71) Applicant: Lenovo (Singapore) Pte. Ltd., Singapore (SG)

(72) Inventor: Matthew Tucker, Chapel Hill, NC (US)

(73) Assignee: LENOVO (SINGAPORE) PTE. LTD., Singapore (SG)

( * ) Notice: Subject to any disclaimer, the term of this patent is extended or adjusted under 35 U.S.C. 154(b) by 186 days.

(21) Appl. No.: 18/393,098

(22) Filed: Dec. 21, 2023

(65) Prior Publication Data

US 2025/0209747 A1 Jun. 26, 2025

(51) Int. Cl.

*G06T 19/00* (2011.01)
*G06T 3/14* (2024.01)
*G09G 5/10* (2006.01)

(52) U.S. Cl.

CPC .............. *G06T 19/006* (2013.01); *G06T 3/14* (2024.01); *G09G 5/10* (2013.01); *G09G 2320/0626* (2013.01)

(58) Field of Classification Search

CPC ........... G06T 19/006; G06T 3/14; G06T 3/00; G09G 5/10; G09G 2320/0626; G06F 3/011

See application file for complete search history.

(56) References Cited

U.S. PATENT DOCUMENTS 11,099,402 B2 * 8/2021 Amadio ................ H04L 67/131
2010/0259464 A1 * 10/2010 Chang .................. H04L 67/141 345/2.3
2018/0095708 A1 * 4/2018 Black .................... A63F 13/211
2020/0143600 A1 * 5/2020 Dai ........................ G06T 19/006
2020/0162851 A1 * 5/2020 Wilde ................ H04B 10/1149
2020/0326544 A1 * 10/2020 Wan ........................ G06T 7/277
2023/0025585 A1 * 1/2023 Palacios .................. G06T 19/20
2023/0377301 A1 * 11/2023 Olia ..................... G06Q 20/123
2024/0036646 A1 * 2/2024 Yu ........................ G06F 3/04815
2024/0355325 A1 * 10/2024 Byrne ..................... G10L 15/22
2025/0138695 A1 * 5/2025 Lal ...................... G06F 3/04815

OTHER PUBLICATIONS

Augmented Reality Code, 2023 © AR Code, Augmented Reality Code by AR Code Pte. Ltd., accessed Dec. 21, 2023 (22 pages). <https://ar-code.com/>.

* cited by examiner

*Primary Examiner* — Grace Q Li

(74) *Attorney, Agent, or Firm* — Carroll, Hoette & Butscher, LLC; Josef L. Hoffmann

(57) ABSTRACT

An augmented reality (AR) system is provided that includes an auxiliary electronic device. The auxiliary electronic device can include at least one sensor configured to detect an indicator on a physical display screen of a primary electronic device. The auxiliary electronic device can also have an optical system including a light source and at least one lens, the optical system configured to generate a virtual display. The auxiliary electronic device may also include one or more processors that may be configured to determine a position of the physical display screen in relation to the auxiliary electronic device based on the indicator detected by the at least one sensor and generate the virtual display at a determined location related to the physical display screen based on the position of the physical display determined.

19 Claims, 5 Drawing Sheets

SYSTEM AND METHOD FOR PROVIDING A DISPLAY SCREEN IN AUGMENTED REALITY

BACKGROUND

Embodiments herein generally relate to devices and methods for controlling the providing a display screen in augmented reality.

Electronic devices, such as laptop computers, mobile phones, personal digital assistants (PDAs), iPads, other computing devices, etc. have become part of many individuals' everyday life. Such electronic devices continue to be improved to make the experience of the user as enjoyable as possible.

In addition, individuals are using their electronic devices in public more and more. Such public use has caused an increased desire for privacy related to the electronic devices. For example, remote workers in a coffee shop working on confidential information have no desire for others in the coffee shop to see the materials on the electronic display of the electronic device.

One highly beneficial use case for augmented reality (AR) technology is for laptop users who frequently work in public areas or areas other than a traditional desk setup. By using the AR technology, a virtual screen can be provided that overlays the actual screen of the laptop so that materials on the screen can only be observed by the user. As a result, AR technology also allows confidential documents or information to be easily viewed by the user without privacy concerns in a public area.

However, mapping the AR content correctly can be problematic. The virtual displays must be world locked rather than head (e.g. user) locked. Current tracking for placement of world-locked virtual content is susceptible to jitter, drift, and other issues which make the displays less usable than a traditional monitor. Also, overlaying virtual displays on top of physical displays can be problematic as well. For example, users have their productivity limited by the small screen real estate offered by a laptop, and likely do not use larger 17" laptops for portability reasons. Many users chose 13" or 14" laptops which have small displays. Another problem caused by the overlap is that materials provided on the physical display can interfere with what the user is observing on the virtual display, making the virtual display unreadable. Another issue with current tracking and virtual content placement is that while a headset knows its orientation in the world, that does not determine where the virtual content should be placed. Consequently, current systems only allow the virtual content to remain in the same location in the world after being placed there. Generally the virtual content is centered in the direction that the headset was pointing when the headset was turned on, but this is rarely ideal and the user must manually re-center the display to their desired orientation.

Current solutions providing an AR generated virtual display include the use of accelerometer and gyros for position. However this solutions can result in drift. Other AR headsets use wide angle cameras on the headset to visually track the world. This solution affects the appearance of the headset and adds significant expense. Other headsets use multiple stationary tracking cameras and infrared light emitting diodes on the headset. Again, this adds undesired equipment and cost to the headsets while still having numerous issues. In another example a base station with infrared light emitting diodes that aid tracking is provided. However, this requires the use of an extra piece of equipment that must be carried by a user, adds expense, and complexity.

Thus, a need exists for improved AR technology for providing a virtual display that can be utilized by a user to improve privacy when in public.

SUMMARY

In accordance with embodiments herein, an augmented reality (AR) system is provided that includes an auxiliary electronic device. The auxiliary electronic device can include at least one sensor configured to detect an indicator on a physical display screen of a primary electronic device. The auxiliary electronic device can also have an optical system including a light source and at least one lens, the optical system configured to generate a virtual display. The auxiliary electronic device may also include a memory to store executable instructions, and one or more processors. The one or more processors when implementing the executable instructions may determine a position of the physical display screen in relation to the auxiliary electronic device based on the indicator detected by the at least one sensor and generate the virtual display at a determined location related to the physical display screen based on the position of the physical display determined.

Optionally, the one or more processors can be further configured to operatively couple the auxiliary electronic device to the primary electronic device and communicate to the primary electronic device to display the indicator on the physical display screen in response to operatively coupling the auxiliary electronic device to the primary electronic device. In one aspect, the one or more processors can be further configured to communicate to the primary electronic device to vary a light level of the physical display screen in response to operatively coupling the auxiliary electronic device to the primary electronic device. In another aspect, the at least one sensor may be a first sensor, and the auxiliary electronic device can include a second sensor configured to obtain position data related to the auxiliary electronic device. The position data can be used to determine the position of the physical display screen in relation to the auxiliary electronic device. In yet another aspect, the first sensor can be a camera and the second sensor may be at least one of an accelerometer or a gyroscope. In one example the one or more processors can be further configured to obtain a user profile of a user of the auxiliary electronic device and determine the position of the physical display screen in relation to the auxiliary electronic device based on settings of the user profile.

In another example, to obtain the user profile the one or more processors can be further configured to obtain context data related to the user and determine the user profile based on the context data. Optionally, the one or more processors may be further configured to determine a size or shape of the virtual display based on the settings of the user profile. In one aspect, the virtual display can include a first virtual display, a second virtual display, and a third virtual display. In another aspect, the virtual display can at least partially overlap the physical display screen, and the one or more processors may be configured to communicate with the primary electronic device to reduce a light level of the physical display screen while the virtual display at least partially overlaps. In one example, the one or more processors may be further configured to position the virtual display a determined distance above the physical display screen. In yet another example, at least three virtual displays can be positioned above the physical display screen.

In accordance with embodiments herein, an augmented reality (AR) system is provided that can include a primary electronic device having a physical display screen. The primary electronic device comprising may include a memory to store executable instructions, and one or more processors. When implementing the executable instructions, the one or more processors may be configured to vary a light level of the physical display screen and display an indicator on the physical display screen. The system may also include an auxiliary electronic device operatively coupled to the primary electronic device. The auxiliary electronic device can include at least one sensor configured to detect the indicator on the physical display screen of the primary electronic device, and an optical system configured to generate a virtual display. The auxiliary electronic device can also include a memory to store executable instructions and one or more processors. When implementing the executable instructions, the one or more processors may be configured to obtain position data from the at least one sensor related by detecting the indicator on the physical display screen, determine a position of the physical display screen in relation to the auxiliary electronic device based on the indicator detected by the at least one sensor, and generate the virtual display at a determined location related to the physical display screen based on the position of the physical display determined.

Optionally, the indicator can be at least one of a QR code, bar code, symbol, or fiduciary marker. In one aspect, the one or more processors of the primary electronic device may be configured to vary the light level of the physical display screen in response to operatively coupling the primary electronic device and the auxiliary electronic device. In one example, the one or more processors of the primary electronic device may be configured to generate the virtual display at the determined location in response to operatively coupling the primary electronic device and the auxiliary electronic device.

In accordance with embodiments herein, a computer implemented method for providing positioning a virtual display is provided. Under control of one or more processors including program instructions, the method can include to obtain, with at least one sensor of an auxiliary electronic device, position data related to an indicator on a physical display screen of a primary electronic device. The method may also include to determine a position of the physical display screen in relation to the auxiliary electronic device based on the indicator detected by the at least one sensor and generate the virtual display at a determined location related to the physical display screen based on the position of the physical display determined.

Optionally, the method may also include to operatively couple the auxiliary electronic device to the primary electronic device, and to communicate to the primary electronic device to display the indicator on the physical display screen in response to operatively coupling the auxiliary electronic device to the primary electronic device. In one example, the method can include communicating to the primary electronic device to vary a light level of the physical display screen in response to operatively coupling the auxiliary electronic device to the primary electronic device. In yet another example, the method can include to obtain a user profile of a user of the auxiliary electronic device and determine the position of the physical display screen in relation to the auxiliary electronic device based on settings of the user profile.

DETAILED DESCRIPTION

Figure 1:
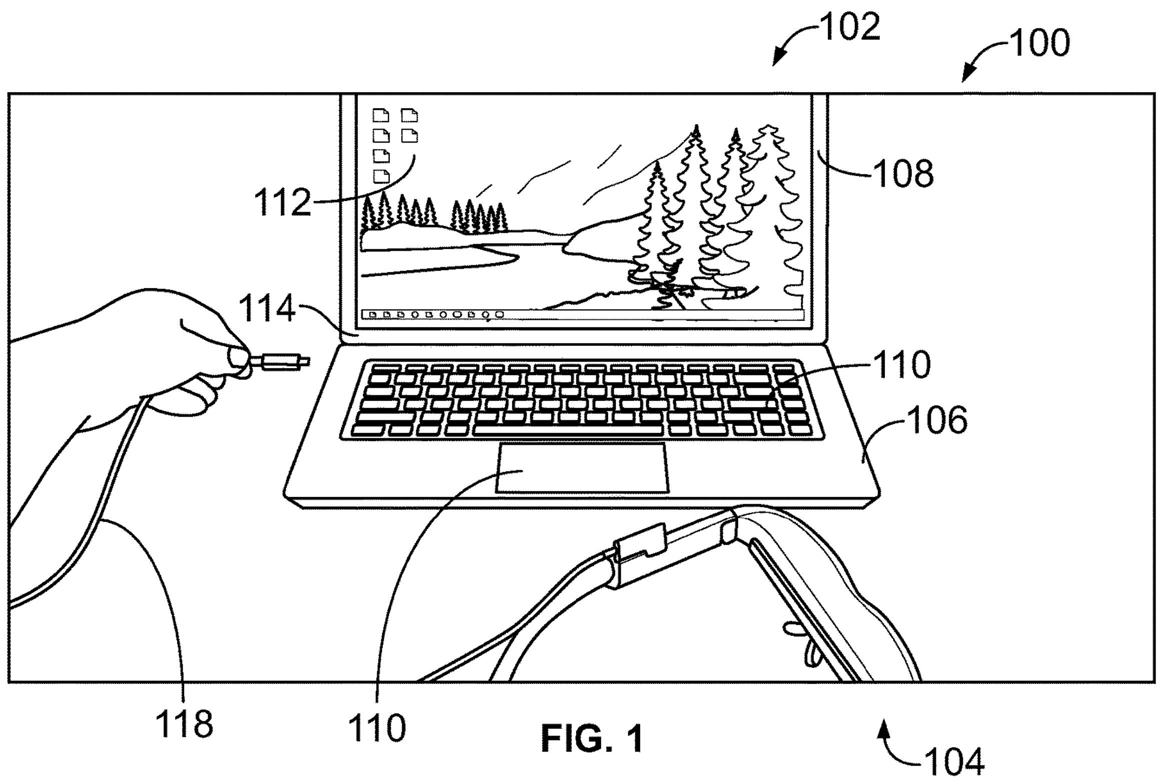
FIG. 1 illustrates a perspective view of an augmented reality system, in accordance with embodiments herein.

It will be readily understood that the components of the embodiments as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, appearances of the phrases "in one embodiment," "in an embodiment" or the like in various places throughout this specification are not necessarily all referring to the same embodiment.

Furthermore, the described features, structures or characteristics may be combined in any suitable manner in one or more embodiments. In the following description, numerous specific details are provided to give a thorough understanding of the various embodiments. One skilled in the relevant art will recognize, however, that the various embodiments can be practiced without one or more of the specific details, or with other methods, components, materials, etc. In other instances, well-known structures, materials, or operations are not shown or described in detail to avoid obfuscation. The following description is intended only by way of example, and simply illustrates certain example embodiments.

The phrase "environment" refers to a physical region in which an electronic device is located. By way of example, an environment may refer to one or more rooms within a public building or other structure, an outdoor area such as a park, or the like. An environment may or may not have physical boundaries. For example, an environment instead be defined based upon a range over which individuals may perceive actions by electronic devices. When an electronic device is portable and/or handheld, an environment associated with the electronic device may shift over time when the electronic device is moved. For example, an environment surrounding a smart phone, tablet device or laptop computer moves with the smartphone, tablet device or laptop computer. An environment surrounding an electronic device will shift each time the electronic device is relocated, such as when moved between different rooms of a home, office building or other residential or commercial structure, within a vehicle, or the like.

The term "primary electronic device" as used herein shall mean an electronic device that is being utilized by a user for performing a function or act as input by the user. In one example, the primary electronic device can be laptop computer on which programs, applications, files, etc. are provided. A user can provide inputs to the primary electronic device via an input device such as a keyboard, mouse, touchscreen, or the like. Example primary electronic devices include mobile devices, cellular telephones, smartphones, tablet computers, personal digital assistants, laptop/desktop computers, gaming systems, media streaming hub devices, IoT devices, or the like.

The term "auxiliary electronic device" as used herein shall mean an electronic device that includes augmented reality technology such that a virtual display can be generated. Example auxiliary electronic devices can include headsets, helmets, glasses, googles, etc. that can generate and project a virtual display.

The term "virtual display" as used herein shall mean a projection generated by an optical system of information that is provided on a physical display screen. The virtual display can be generated by an auxiliary electronic device through hardware such as lenses such that the virtual display can only be observed by someone looking through such hardware (e.g. lenses). Still, when an input is provided at a primary electronic device, the resultant output can be observed on the virtual display.

The term "indicator" as used herein shall mean any code, marker, graphic, symbol, or the like that can be detected by a sensor such as a camera. The indicator in example embodiments can include information coded or embedded therein that can be determined by another device. In other embodiments such information is not coded or embedded within the indicator. Example indicators include codes, QR codes, bar codes, shapes, graphics, fiduciary markers, photos, drawings, color schemes, symbols, words, number combinations, or the like.

The phrases "operatively couple", "operatively coupled", and operatively coupling" can be used interchangeably herein and as used herein shall mean an electrical, mechanical, or virtual coupling that results in the input of one electronic device being provided as an output by another electronic device. In one example, when a primary electronic device is operatively coupled to an auxiliary electronic device, by typing the word "electronic" using the keys of the primary electronic device results in the word "electronic" being displayed on a virtual display generated by the auxiliary electronic device.

The phrase "real-time" as used herein shall mean at the same time, or a time substantially contemporaneous, with an occurrence of another event or action. For the avoidance of doubt, as an example, a dynamically adjusted object or device is changed immediately, or within a second or two.

The term "obtains" and "obtaining", as used in connection with data, signals, information and the like, include at least one of i) accessing memory of an external device or remote server where the data, signals, information, etc. are stored, ii) receiving the data, signals, information, etc. over a wireless communications link between the base device and a secondary device, and/or iii) receiving the data, signals, information, etc. at a remote server over a network connection. The obtaining operation, when from the perspective of a base device, may include sensing new signals in real-time, and/or accessing memory to read stored data, signals, information, etc. from memory within the base device. The obtaining operation, when from the perspective of a secondary device, includes receiving the data, signals, information, etc. at a transceiver of the secondary device where the data, signals, information, etc. are transmitted from a base device and/or a remote server. The obtaining operation may be from the perspective of a remote server, such as when receiving the data, signals, information, etc. at a network interface from a local external device and/or directly from a base device. The remote server may also obtain the data, signals, information, etc. from local memory and/or from other memory, such as within a cloud storage environment and/or from the memory of a personal computer.

It should be clearly understood that the various arrangements and processes broadly described and illustrated with respect to the Figures, and/or one or more individual components or elements of such arrangements and/or one or more process operations associated of such processes, can be employed independently from or together with one or more other components, elements and/or process operations described and illustrated herein. Accordingly, while various arrangements and processes are broadly contemplated, described and illustrated herein, it should be understood that they are provided merely in illustrative and non-restrictive fashion, and furthermore can be regarded as but mere examples of possible working environments in which one or more arrangements or processes may function or operate.

A system and methods are provided for providing a virtual display for an electronic device using an augmented reality (AR) system. When a user connects an AR or virtual reality auxiliary electronic device (e.g., headset) via cable or wirelessly to a primary electronic device the display of the primary electronic device automatically turns predominately black or off. Then at least one indicator, such as a QR code or other graphic, appears on the display. A sensor such as a camera on the auxiliary electronic device (e.g., headset) detects the indicator and uses the indicator to assess the position of the auxiliary electronic device in relation to the primary electronic device. Accelerometers and gyros in the auxiliary electronic device are utilized in relation to the detected indicator to provide positioning of the virtual display. The virtual display can be positioned either in the same area as the physical display of the primary electronic device, above the physical display, etc. In one example such a determination can be made based on a profile or settings of the user. By using a virtual display the user can use the primary electronic device, with the display screen only visible to them through the auxiliary electronic device. If a larger display is desired, the settings at the auxiliary electronic device can be adjusted accordingly to increase the size of the virtual display. Similarly, the location of virtual display can also be varied by adjusting the settings. In this manner, the virtual display can be located a couple of inches above the physical display to provide better ergonomics for the user.

As a result of using the AR system, a more streamlined process is provided for providing larger, more ergonomically appeasing private displays that facilitate viewing. For example, by providing auto-dimming of the device screen when the virtual display is generated, the virtual display is more easily viewed. To this end, by darkening the physical display, an ideal background for the virtual display is provided.

FIG. 1 is an augmented reality system 100 that includes a primary electronic device 102 and an auxiliary electronic device 104, such as a headset that receives power from the primary electronic device 102. The auxiliary electronic device 104 can be configured to generate a virtual display (FIGS. 4-5) related to the electronic device 102. By way of example, the primary electronic device 102 may be a mobile device, such as a cellular telephone, smartphone, tablet computer, personal digital assistant, laptop/desktop computer, gaming system, a media streaming hub device, IoT device, or the like. In one example the electronic device 102 may include an electronic terminal that includes a user interface and is configured to access a network over a wired or wireless connection. As non-limiting examples, the primary electronic device 102 may access the network through a wireless communications channel and/or through a network connection (e.g. the Internet). The primary electronic device 102 in one embodiment is in communication with a network resource via the network. The network resource can be a server, application, remote processor, the cloud, etc. In one example, the network resource is one or more processors of an auxiliary electronic device 104 that communicates over the network with the primary electronic device 102. The network may represent one or more of a local area network (LAN), a wide area network (WAN), an Intranet or other private network that may not be accessible by the general public, or a global network, such as the Internet or other publicly accessible network.

Additionally or alternatively, primary the electronic device 102 may be a wired or wireless communication terminal, such as a desktop computer, laptop computer, network-ready television, set-top box, and the like. The primary electronic device 102 may be configured to access the network using a web browser or a native application executing thereon. In some embodiments, the primary electronic device 102 may have a physical size or form factor that enables it to be easily carried or transported by a user, or the primary electronic device 102 may have a larger physical size or form factor than a mobile device.

The primary electronic device 102 in one example includes a base subassembly 106 and a display subassembly 108. The base subassembly 106 can be rotatably coupled to the display subassembly 108 such that the display subassembly 108 can be moved from a closed position to an open position. Alternatively the base subassembly 106 can be detachable from the display subassembly 108. In yet other examples, such as when the electronic device is a phone, just a display subassembly 108 can be provided.

The base subassembly 106 can include inputs 110. The inputs 110 can include keys that include letters, numbers, functions, a mouse, a mouse pad, or the like. In this manner the inputs 110 can be utilized to input information into the electronic device. Such information can include words typed into a document, website, email, text, or the like. In an alternative embodiment the inputs 110 may be part of the display subassembly 108.

The display subassembly 108 can include a display screen 112, and one or more sensors 114. The one or more sensors 114 can include cameras, microphones, or the like. In one embodiment the one or more sensors 114 are located in the base subassembly 106. The display screen 112 of the display subassembly can include lighting that can be varied. In one example, the display screen includes numerous pixels that can generate a light output that can vary in intensity, color, or the like. For example, when a virtual display is being provided, the display screen 112 can be dimmed, or even turned off to facilitate viewing of the virtual display that may at least partially overlap the display screen 112. Such lighting may be adjusted, or varied, automatically in real-time upon the virtual display being generated, or alternatively, in response to sensors determining light levels in an environment and adjusting the lighting accordingly.

Figure 3:
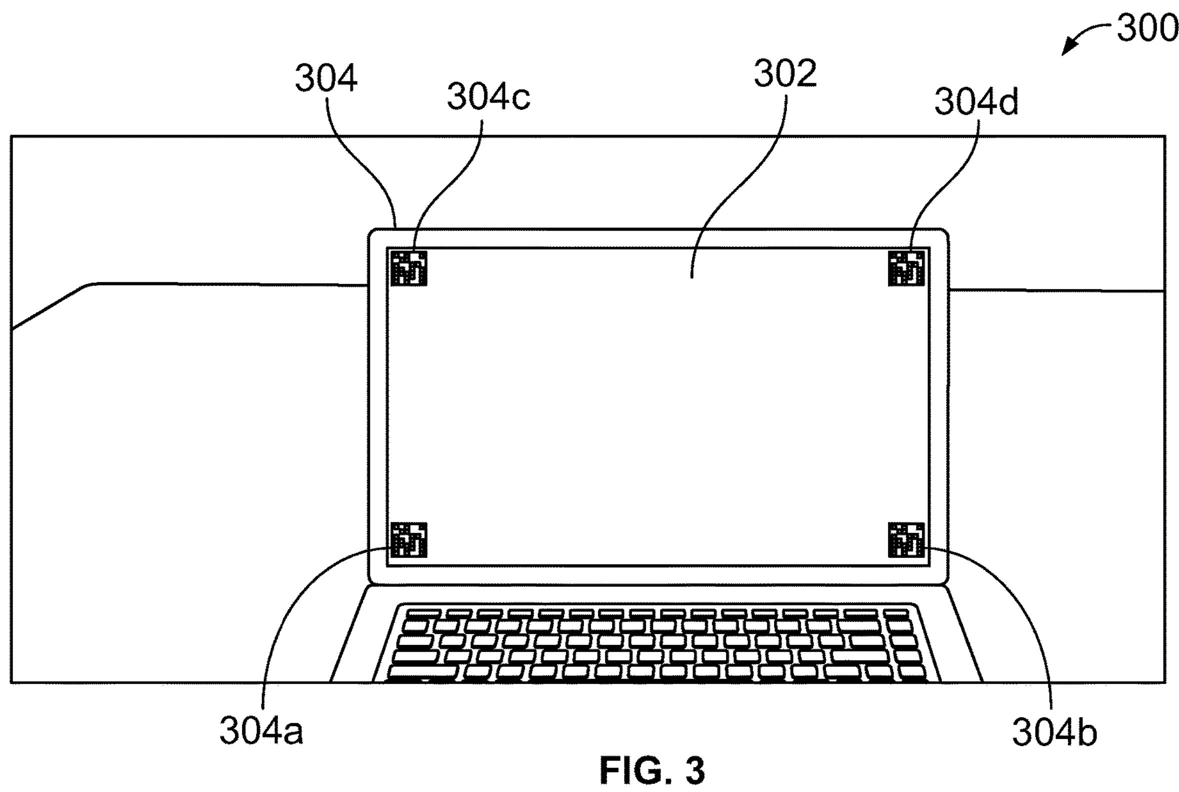
FIG. 3 illustrates a perspective view a virtual display of an augmented reality system, in accordance with embodiments herein.

In one example the display screen 112 can display at least one indicator (see FIG. 3). The at least one indicator can be a code, QR code, bar code, shape, graphic, fiduciary marker, photo, drawing, color scheme, symbol, word, number combination, or the like. In one example, a portion of the pixels that form the display screen 112 can form the indicator. In one example the indicator may be a QR code that provides information to one or more processors of the auxiliary electronic device 104 related to the positioning of the display screen 112. Alternatively, the indicator simply by being detected provides information required to determine the position of the display screen 112.

The auxiliary electronic device 104 in one example can be a headset. Alternatively, the auxiliary electronic device 104 can be a pair of glasses, a helmet, visor, etc. that is worn by a user and able to generate a virtual image. The auxiliary electronic device 104 can include a power chord 118 that couples the auxiliary electronic device 104 to the primary electronic device 102 such that the auxiliary electronic device 104 is powered by a power module (e.g., battery) of the primary electronic device 102. Alternatively, the auxiliary electronic device 104 can wirelessly communicate with the primary electronic device 102 and have a self-contained power source such as an auxiliary electronic device battery.

The auxiliary electronic device 104 can also include at least one sensor configured to detect an indicator generated on the display screen 112 of the primary electronic device 102. The at least one sensor 114 can be a camera, infrared camera, or the like. The at least one sensor can be positioned to facilitate the sensor 114 detecting the indicator. The position can be at a side of a pair of glasses (e.g., the auxiliary electronic device) that aligns with the location on the display screen 112 where the indicator is located. In another example, the sensor may rotate or move to adjust an angle to better locate the indicator on the display screen 112.

Figure 2:
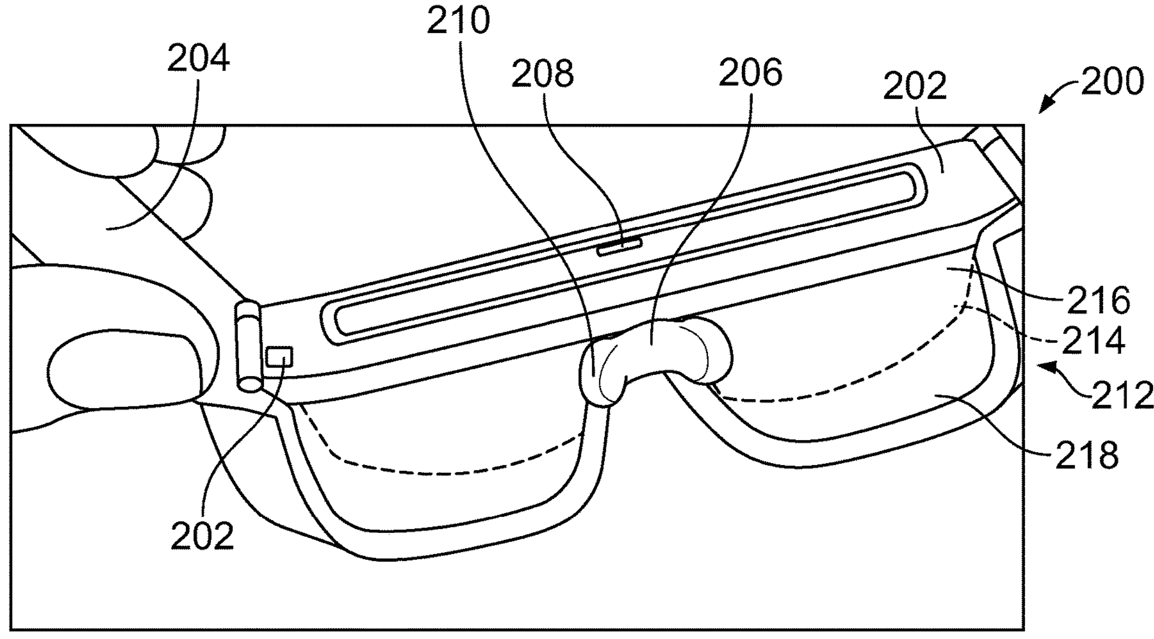
FIG. 2 illustrates a perspective view of a headset of an augmented reality system, in accordance with embodiments herein.

FIG. 2 illustrates an example auxiliary electronic device 200, where in the example of FIG. 2 the auxiliary electronic device 200 is a headset. In one example the auxiliary electronic device of FIG. 2 is the auxiliary electronic device of FIG. 1.

The auxiliary electronic device (e.g., headset) includes a frame 202 including earpieces 204 configured to rest on the ears of a user. A forehead bridge 206 hingedly couples to each of the earpieces and can include an input port 208 for receiving a chord. The input port can be a USB port, USC port or the like such that the auxiliary electronic device 200 can be coupled to a primary electronic device to receive power. In another example the chord can be a communication chord such that information and data can be passed between the primary electronic device and the auxiliary electronic device. The auxiliary electronic device 200 can also include a nose piece 210 to make wearing the auxiliary electronic device 200 more comfortable.

The auxiliary electronic device also includes an optical system 212 that generates a virtual display. The optical system 212 can include one or more light sources 214 configured to provide generate a digital, or virtual display, by emitting the light through a first lens 216 and a second lens 218. In one example the one or more light sources can include light emitting diodes, pixels, or the like for emitting the light. Such light can be varied, including varying color, intensity, shading, contrast, or the like. The first lens 216 and second lens 218 are positioned to be located adjacent the eyes of the user such that the user observes the virtual display generated by the light sources 214 through the first lens 216 and second lens 218.

The auxiliary electronic device can also include one or more sensors 220 disposed on the frame 202. The sensors 220 include sensors utilized to determine the position and movement of the auxiliary electronic device 200. These sensors 220 include accelerometers, three-dimensional accelerometers, gyroscopes, or the like that can detect the changing position of the auxiliary electronic device 200. The sensors 220 can also include devices that can detect an indicator on a display screen of a primary electronic device. These sensors can include cameras, infrared cameras, or the like that can detect the indicator. The sensors 220 can be electrically coupled to one or more processors, memory, transceivers, etc. of the auxiliary electronic device to provide the functionality as described herein.

FIG. 3 illustrates a primary electronic device 300 with a display screen 302 that includes indicators 304. In one example the primary electronic device 300 is the primary electronic device of FIG. 1. As compared to the display screen of FIG. 1 the shows a screen saver, the display screen 302 of FIG. 3 illustrates a dimmed display screen that can facilitate viewing of a virtual display that overlays the display screen 302. In the example the indicator 304 is illustrated as a first QR code 304*a* and a second QR code 304*b* placed in either of the bottom corners of the display screen 302. Additional indicators 304*c*, 304*d* can also be provided. In this manner, a sensor of the auxiliary electronic device can easily detect at least one of the indicators 304*a*, 304*b*, 304*c*, 304*d* to determine the exact location of the display screen 302. To this end, when an indicator 304 such as a QR code is utilized, the QR code can embed information therein that can also be detected by a sensor system of the auxiliary electronic device. As an example, the QR codes can provide exact distance between the QR codes, exact distance to an edge of a screen, exact distance to the edge of the display screen 302, the exact measurement of the perimeter of the screen, or the like. Alternatively, the indicator provides a marker that can be used to make determinations related to the location of the exact location of the display screen 302. In one such example, additional sensors such as accelerometers, gyroscopes, or the like can be used to obtain positional information related to the auxiliary electronic device to make the determination.

Figure 4:
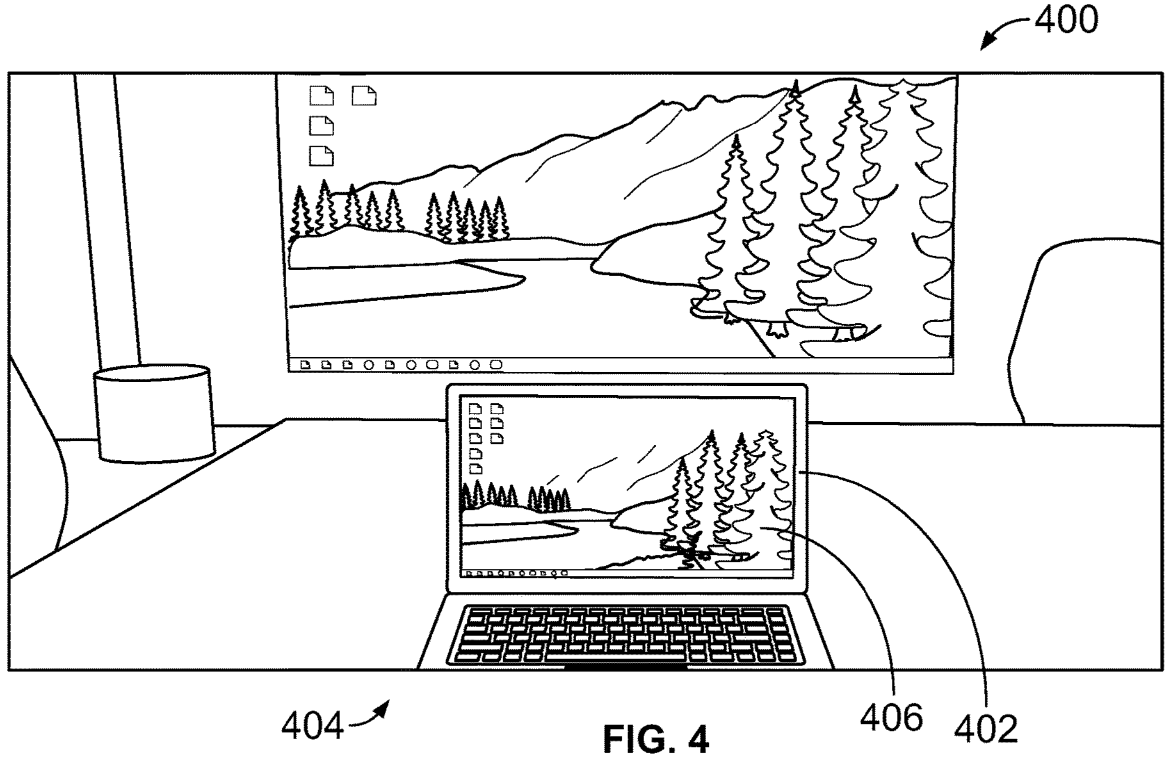
FIG. 4 illustrates a perspective view a virtual display of an augmented reality system, in accordance with embodiments herein.
Figure 5:
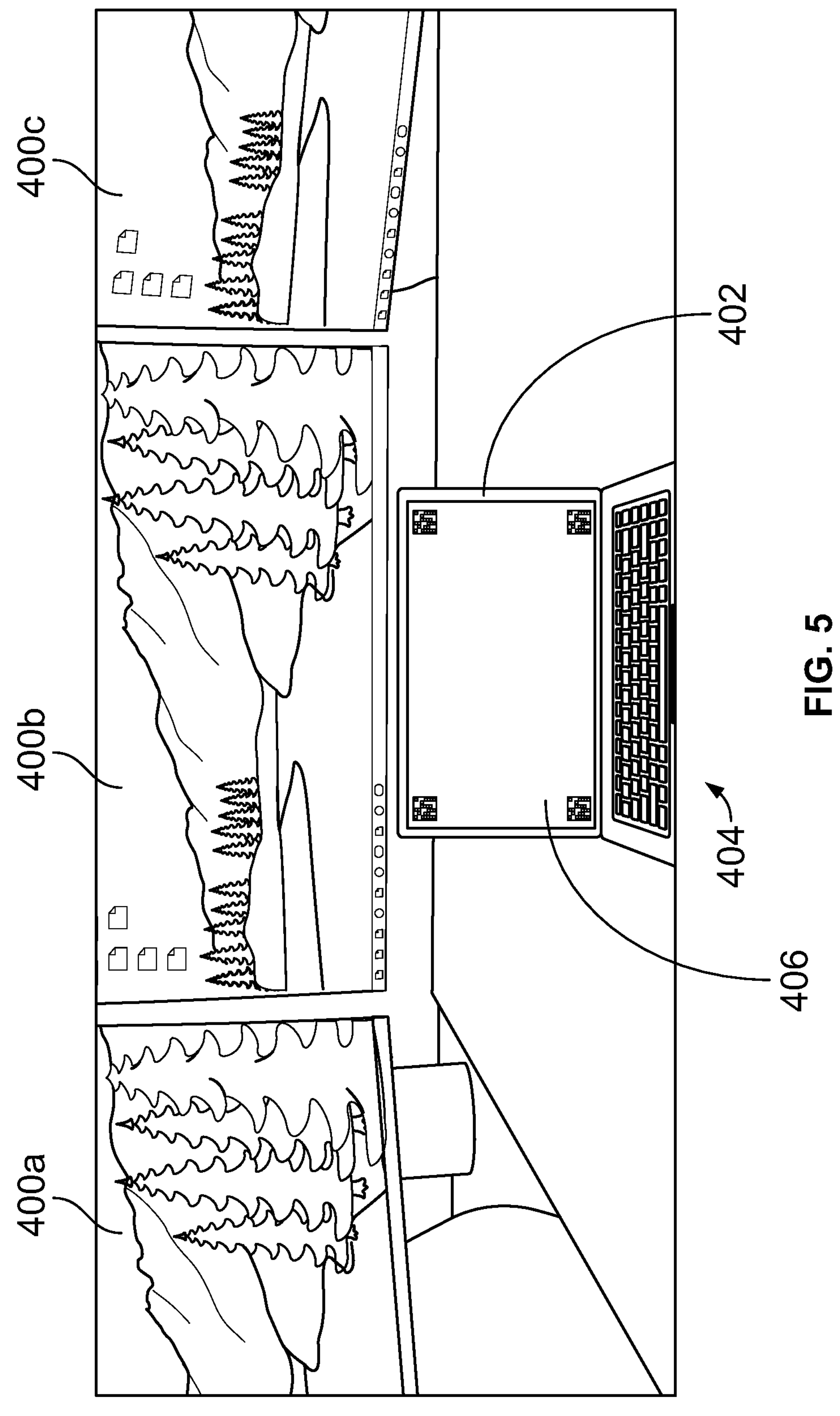
FIG. 5 illustrates a perspective view a virtual display of an augmented reality system, in accordance with embodiments herein.

FIGS. 4 and 5 illustrate examples of the virtual displays 400 that can be generated by the auxiliary electronic device utilizing the AR system of FIG. 1 and described herein. The virtual display 400 of FIG. 4 is placed adjacent and above the display assembly 402 of a primary electronic device 404. As illustrated, the virtual display can be larger than the display screen 406 of the primary electronic device 404. This facilitates viewing of the screen, especially when the primary electronic device is small for the convenience of traveling. To adjust the size a user can just adjust the settings to the size desired by the user. The positioning of the virtual display above the display assembly 402 also improves ergonomics for instances such as when at an airport and sitting with the primary electronic device in one's lap. In this manner the user does not have to slouch down to see what they are inputting on the screen. FIG. 5 illustrates a variation of FIG. 4 where a first, second, and third virtual display 400*a*, 400*b*, and 400*c* respectfully are provided. In this manner, the user can organize materials on different screen to achieve multiscreen functionality without having to carry additional screens with them.

Figure 6:
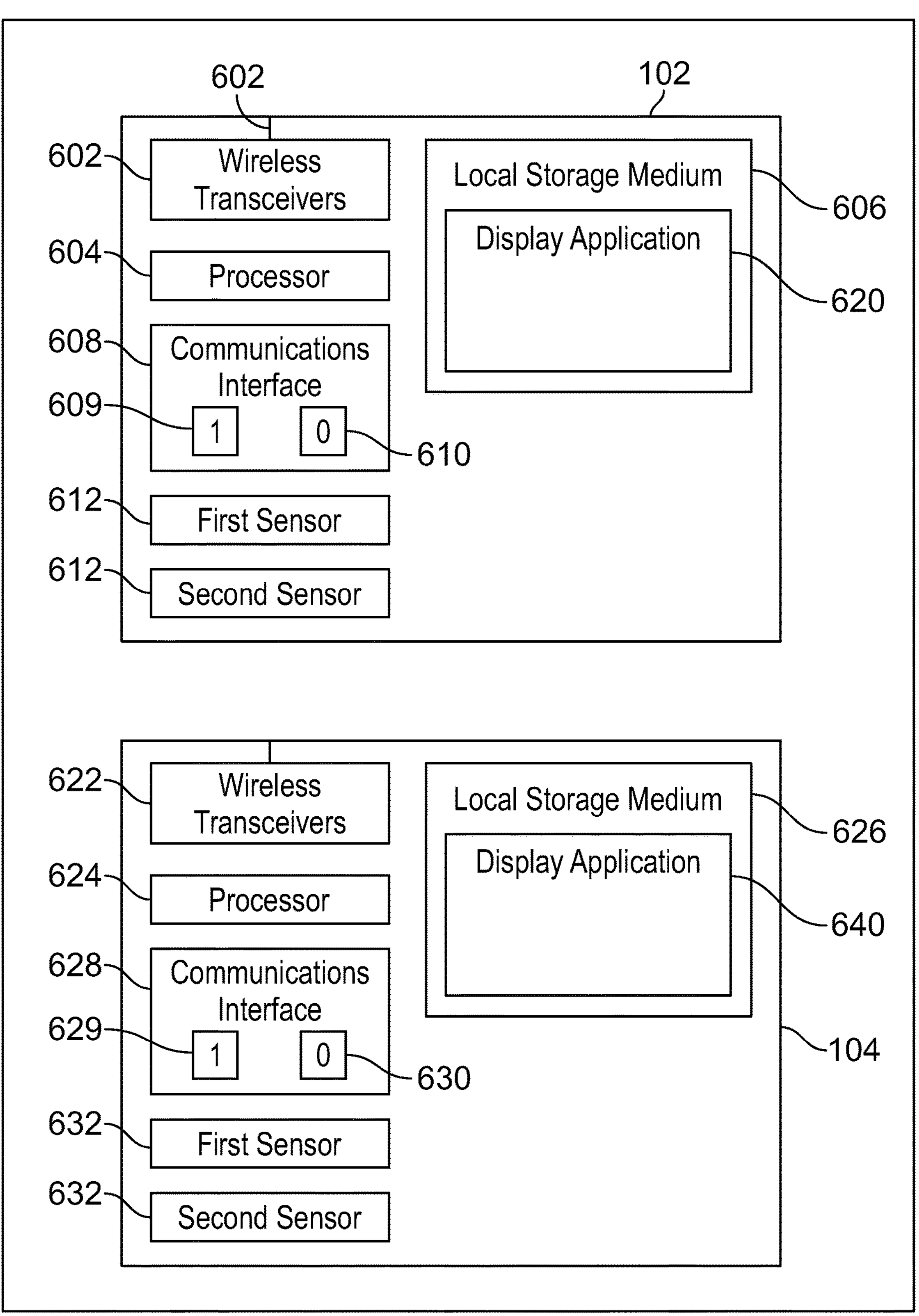
FIG. 6 illustrates a schematic block diagram of an electronic device, in accordance with embodiments herein.

FIG. 6 illustrates a simplified block diagram of the primary electronic device 102 and an auxiliary electronic device 104 of FIGS. 1-5 in accordance with an embodiment. The primary electronic device 102 includes components such as one or more wireless transceivers 602, one or more processors 604 (e.g., a microprocessor, microcomputer, application-specific integrated circuit, etc.), and one or more local storage medium (also referred to as a memory portion) 606.

Each transceiver 602 can utilize a known wireless technology for communication. Exemplary operation of the wireless transceivers 602 in conjunction with other components of the primary electronic device 102 may take a variety of forms and may include, for example, operation in which, upon reception of wireless signals, the components of primary electronic device 102 communicate with an auxiliary electronic device 104 and the transceiver 602 demodulates the communication signals to recover incoming information, such as responses to inquiry requests, voice and/or data, transmitted by the wireless signals. The one or more processors 604 format outgoing information and convey the outgoing information to one or more of the wireless transceivers 602 for modulation to communication signals. The wireless transceiver(s) 602 convey the modulated signals to a remote device, such as a cell tower or a remote server (not shown).

The local storage medium 606 can encompass one or more memory devices of any of a variety of forms (e.g., read only memory, random access memory, static random access memory, dynamic random access memory, etc.) and can be used by the one or more processors 604 to store and retrieve data. The data that is stored by the local storage medium 606 can include, but need not be limited to, operating systems, applications, including a display application, obtained context data, informational data, or the like. Each operating system includes executable code that controls basic functions of the device, such as interaction among the various components, communication with external devices via the wireless transceivers 602, and storage and retrieval of applications and context data to and from the local storage medium 606.

The electronic device 102 in one embodiment also includes a communications interface 608 that is configured to communicate with a network resource. The communications interface 608 can include one or more input devices 609 and one or more output devices 610. The input and output devices 609, 610 may each include a variety of visual, audio, and/or mechanical devices. For example, the input devices 609 can include a visual input device such as an optical sensor or camera, an audio input device such as a microphone, and a mechanical input device such as a keyboard, keypad, selection hard and/or soft buttons, switch, touchpad, touch screen, icons on a touch screen, a touch sensitive areas on a touch sensitive screen and/or any combination thereof. Similarly, the output devices 610 can include a visual output device such as a liquid crystal display screen, one or more status indicators that may be light elements such as light emitting diodes, an audio output device such as a speaker, alarm and/or buzzer, and a mechanical output device such as a vibrating mechanism. The display may be touch sensitive to various types of touch and gestures. As further examples, the output device(s) 610 may include a touch sensitive screen, a non-touch sensitive screen, a text-only display, a smart phone display, an audio output (e.g., a speaker or headphone jack), and/or any combination thereof.

In one example the output device 610 can be a display screen that includes numerous individual pixels that each emit light. The one or more processors 602 can be configured to vary the light emitted by each individual pixel do change the color or intensity of each individual light. In this manner the one or more processors can control the subject matter that is displayed. To this end the output device can display pictures, webpages, documents, presentations, screen savers, or the like that very in color, shading, etc. In one example, the output device 610 can be operated by the one or more processors to display one or more indicators, such as QR codes, on the display. In another example, when the one or more processors determine that a visual display is being generated by the auxiliary electronic device 104, the light emitted can be automatically reduced, or dimmed, or alternatively can be turned off. In one example, the light emitted by all pixels, other than the pixels emitting the light that is displaying an indicator, is reduced or turned off such that only indicators can be observed on the output device 610.

The primary electronic device 102 can also include one or more sensors 612. The one or more sensors can include cameras, infrared cameras, microphones, light level sensors, power consumption sensors, or the like. The sensors 620 are configured to obtain data and information related to the user, environment, the primary electronic device 102 and/or auxiliary electronic device 104. For example, when a sensor is a camera, the camera can identify that user of the primary electronic device. This information can be utilized to determine a profile of the user and settings desired by the user. A camera can also determine the user is utilizing the auxiliary electronic device 104 such that responsive to such a determination the output device 610 can reduce light levels and display one or more indicators. Alternatively, the sensor 612 can detect that the auxiliary electronic device is consuming power from the primary electronic device, also resulting in reducing light levels and displaying an indicator.

The primary electronic device 102 also includes a display application 620 that configures the one or more processors of the primary electronic device 102 to determine that the auxiliary electronic device 104 is being utilized for providing a virtual display. In one example the display application 620 includes instructions for the one or more processors to use obtained sensor data or information to determine the auxiliary electronic device 104 is being used for providing a virtual display. Alternatively, the display application 620 includes instructions for the one or more processors such that the auxiliary electronic device 104 can provide a communication or command that is virtual display is desired to be generated. In response to receiving the command the light levels on the display are reduced or turned off and the one or more indicators are displayed. All of these components of the primary electronic device 102 can be operatively coupled to one another, and can be in communication with one another, by way of one or more internal communication links, such as an internal bus.

The auxiliary electronic device 104 can also include components such as one or more wireless transceivers 622, one or more processors 624 (e.g., a microprocessor, microcomputer, application-specific integrated circuit, etc.), and one or more local storage medium (also referred to as a memory portion) 626.

Each transceiver 622 can utilize a known wireless technology for communication. Exemplary operation of the wireless transceivers 622 in conjunction with other components of the auxiliary electronic device 104 may take a variety of forms and may include, for example, operation in which, upon reception of wireless signals, the components of auxiliary electronic device 104 communicate with the primary electronic device 102 and the transceiver 622 demodulates the communication signals to recover incoming information, such as responses to inquiry requests, voice and/or data, transmitted by the wireless signals. The one or more processors 624 format outgoing information and convey the outgoing information to one or more of the wireless transceivers 622 for modulation to communication signals. The wireless transceiver(s) 622 convey the modulated signals to a remote device, such as a cell tower or a remote server (not shown).

The local storage medium 626 can encompass one or more memory devices of any of a variety of forms (e.g., read only memory, random access memory, static random access memory, dynamic random access memory, etc.) and can be used by the one or more processors 624 to store and retrieve data. The data that is stored by the local storage medium 626 can include, but need not be limited to, operating systems, applications, including a display application, obtained context data, informational data, or the like. Each operating system includes executable code that controls basic functions of the device, such as interaction among the various components, communication with external devices via the wireless transceivers 622, and storage and retrieval of applications and context data to and from the local storage medium 626.

The auxiliary electronic device 104 in one embodiment also includes a communications interface 628 that is configured to communicate with a network resource. The communications interface 628 can include one or more input devices 629 and one or more output devices 630. The input and output devices 629, 630 may each include a variety of visual, audio, and/or mechanical devices. For example, the input devices 629 can include a visual input device such as an optical sensor or camera, an audio input device such as a microphone, and a mechanical input device such as a keyboard, keypad, selection hard and/or soft buttons, switch, touchpad, touch screen, icons on a touch screen, a touch sensitive areas on a touch sensitive screen and/or any combination thereof. Similarly, the output devices 630 can include a visual output device such as a liquid crystal display screen, one or more status indicators that may be light elements such as light emitting diodes, an audio output device such as a speaker, alarm and/or buzzer, and a mechanical output device such as a vibrating mechanism. The display may be touch sensitive to various types of touch and gestures.

In one example the output device 630 can be an optical system that generates and projects a virtual display. The optical system can include light sources and at least one optical lens that generates a virtual display that can only be observed by a user wearing or using the auxiliary electronic device 104. In one example the optical system can generate a single virtual display over the physical display of a primary electronic device 102. Alternatively the virtual display can be presented below, above, or to the side of the physical display of the primary electronic device. In one example, the output device 630 generates the virtual display based on settings of a user profile.

The auxiliary electronic device 104 can also include one or more sensors 632. The one or more sensors can include cameras, infrared cameras, light level sensors, power consumption sensors, accelerometers, gyroscopes, or the like. In one example, the sensor is a camera or infrared camera that is configured to obtain or detect an indictor on the physical display of the primary electronic device 102 as previously described. In another example a sensor 632 can be an accelerometer, gyroscope, or the like that is configured to obtain data or information that can be utilized to determine the position and/or movement of the auxiliary electronic device 104 in relation to the display screen of the primary electronic device 102.

The auxiliary electronic device 104 can also include a display application 640. The display application 640 can include instructions to configure the one or more processors 624 to operate the auxiliary electronic. These instructions can include how to obtain user characteristics or other context data and determine the user of the primary electronic device. Based on determining the user, a profile associated with the user can be obtained that includes settings related to the virtual display to be generated by the auxiliary electronic device. In one example, the settings can provide the location and/or how many virtual display(s) are desired by the user. In addition, the size of each virtual display can also be provided in the settings.

The display application 640 can also configure the auxiliary electronic device 104 to communicate with the primary electronic device regarding when to reduce the light output of the display screen and when to generate an indicator on the display screen. In addition, the display application 640 can obtain data and information from position sensors such as accelerometers, gyroscopes, or the like and indicator data and information and determine the location of the display screen of the primary electronic device based on this data and information. Then, once the position of the display screen is located, the display application 640 can provide instructions to determine where to place one or more virtual displays in relation to the display screen. This can include on the display screen, above, below, or to the side of the display screen, whether to present the virtual display at an angle, etc. In one embodiment such a determination is made in part based on settings information. In another example these determinations are made based on default settings. In addition, the display application can also include instructions to determine the size and/or shape of each virtual display.

Figure 7:
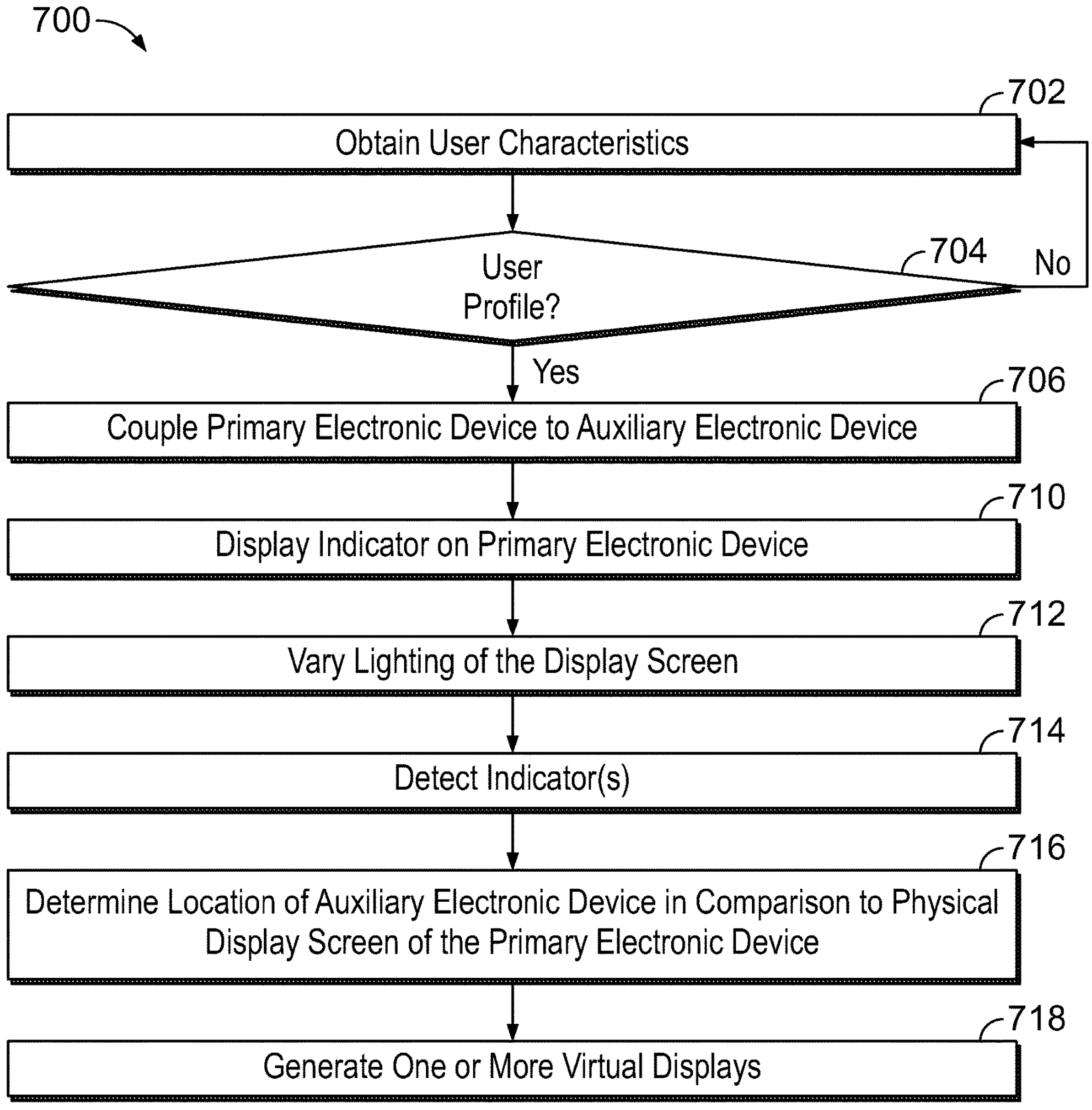
FIG. 7 illustrates a block diagram of a process for providing a virtual display, in accordance with embodiments herein.

FIG. 7 illustrates a block diagram of a method 700 of utilizing a virtual display for a primary electronic device. The method 700 may be implemented utilizing the control system of FIG. 6 and the AR system and electronic devices of any of the previous figures.

At 702, one or more processors of an auxiliary electronic device obtain user characteristics. In one example, the user characteristics are obtained via detecting an individual using the primary electronic device using a sensor such a camera, microphone, motion detector, or the like of the primary electronic device and communicating either the information or data detected, or identity of the user to the auxiliary electronic device. To this end, facial recognition, voice recognition, artificial intelligence (AI) modeling, etc. may be used to obtain the user characteristics. In addition, information input into the primary electronic device or auxiliary electronic device may be used to obtain the user characteristic, including the identity of the individual using the respective electronic device. Such input information includes login information, passwords, application logins and passwords, permission settings, fingerprint scanning, retinal scanning, user profile, user settings, or the like. User characteristics can include the age of a user, permission settings of a user, identification of a user, inputs of a user, or the like. In each instance, the user characteristic obtained provides information related to the identity of the individual using the electronic device.

At 704, the one or more processors determine if a user profile and/or settings are available for the individual using the electronic device and/or the application being used. In particular, based on both user characteristics obtained, and electronic device characteristics obtained, determinations are made regarding the identity of the individual using the electronic device along with applications being utilized by the electronic device. Such determinations may be made using a mathematical model, lookup table, decision tree, algorithm, mathematical function, or the like. The user settings can include the location of a desired virtual display, the size or shape of the virtual display, the number of virtual displays to be shown, or the like. In this manner the user can customize the virtual display experience for themselves. In one example, if the user has not provided their own settings default settings can be provided such as placing the virtual display over the physical display of the primary electronic device. If at 704, a determination cannot be made of the availability of a user profile or setting information, then the one or more processors utilize default settings.

Once settings are determined, at 706, the one or more processors of the primary electronic device and/or auxiliary electronic device operationally couple to one another. By being operationally coupled, the auxiliary electronic device can receive inputs that are provided at the primary electronic device and execute functions based on the inputs. To this end, if a user is preparing a presentation by inputting words into the presentation using inputs e.g., keys), of the primary electronic device, the words will appear in the virtual display being generated by the auxiliary electronic device as though the virtual display is the physical display of the primary electronic device. Thus, any operation performed at the primary electronic device is presented on the virtual display generated by the auxiliary electronic device as though the virtual display is a physical display screen of the primary electronic device.

In one example, to determine that the primary electronic device should operationally couple to the auxiliary electronic device, one or more sensors of the primary electronic device detect data and information utilized to make the determination. As an example, the one or more processors can receive user characteristics from a camera that shows the user is wearing the auxiliary electronic device. Alternatively, a detection is made that power is being provided from the primary electronic device to the auxiliary electronic device that has been identified as an auxiliary electronic device that can generate a virtual display. In another example, the primary electronic device and auxiliary electronic device communicate with one another either through a wire, wirelessly, over the air, etc. such that the one or more processors of the primary electronic device receives a communication or data in a communication that the auxiliary electronic device that generates a virtual display is operating and is ready to operationally couple to the primary electronic device.

In response to operational coupling between the primary electronic device and the auxiliary electronic device, at 710, the one or more processors of the primary electronic device display at least one indicator on the display screen of the primary electronic device. The indicator can be any indicator previously described and in one example is a QR code. The indicator is provided so that the auxiliary electronic device can determine the exact location of the physical display screen compared to the auxiliary electronic device.

In response to operational coupling between the primary electronic device and the auxiliary electronic device, at 712 the one or more processors of the primary electronic device can vary the lighting of the display screen of the primary electronic device. In particular, to facilitate viewing and/or detecting of an indicator, the lighting of other portions of the display screen can be reduced (e.g., dimmed) or turned completely off. In addition, when the settings indicate that the virtual display is to at least partially overlay the physical display screen, by reducing the light level of the physical display screen, reading the virtual display becomes easier for the user. In addition, by reducing the light output, or even turning off the physical display screen, nefarious third parties in a public environment are unable to read or comprehend the subject matter on the physical display screen. As a result, confidentiality and privacy are improved.

At 714, the one or more sensors of the auxiliary electronic device detect the indicator(s) on the physical display screen. In example embodiments the sensors can include a camera, infrared camera, or the like to detect the indicator.

At 716, the one or more processors of the auxiliary electronic device determine the location of the auxiliary electronic device in comparison to the physical display screen of the primary electronic device based on the detection of the indicator(s). In one example, in addition to the information and/or data received from detecting the indicator(s) the auxiliary electronic device can have sensors such as accelerometers, gyroscopes, or the like that also provide information and data utilized to determine the location of the physical display screen compared to the auxiliary electronic device. To make the determination the one or more processors may utilize one or more of a mathematical equation, mathematical model, artificial intelligence model, algorithm, function, lookup table, decision tree, computer simulated model, or the like to make the determination with the data and information provided.

In response to determining the position of the physical display screen to the auxiliary electronic device, at 718, the one or more processors of the auxiliary electronic device generate one or more virtual display screens in determined location(s). In one example, based on settings, including profile settings, default settings, manually inputted settings, etc., the virtual display(s) are generated at determined locations. To this end, the virtual display can be generated to be any size, shape, or angle as can be determined by the user. Thus, the AR system and method provide privacy in public while improving functionality and use of the AR system.

As will be appreciated, various aspects may be embodied as a system, method or computer (device) program product. Accordingly, aspects may take the form of an entirely hardware embodiment or an embodiment including hardware and software that may all generally be referred to herein as a "circuit," "module" or "system." Furthermore, aspects may take the form of a computer (device) program product embodied in one or more computer (device) readable data storage device(s) having computer (device) readable program code embodied thereon.

Any combination of one or more non-signal computer (device) readable mediums may be utilized. The non-signal medium may be a data storage device. The data storage device may be, for example, an electronic, magnetic, optical, electromagnetic, infrared, or semiconductor system, apparatus, or device, or any suitable combination of the foregoing. More specific examples of a data storage device may include a portable computer diskette, a hard disk, a random access memory (RAM), a dynamic random access memory (DRAM), a read-only memory (ROM), an erasable programmable read-only memory (EPROM or Flash memory), a portable compact disc read-only memory (CD-ROM), an optical storage device, a magnetic storage device, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of network, including a local area network (LAN) or a wide area network (WAN), or the connection may be made through other devices (for example, through the Internet using an Internet Service Provider) or through a hard wire connection, such as over a USB connection. For example, a server having a first processor, a network interface and a storage device for storing code may store the program code for carrying out the operations and provide this code through the network interface via a network to a second device having a second processor for execution of the code on the second device.

Aspects are described herein with reference to the figures, which illustrate example methods, devices and program products according to various example embodiments. These program instructions may be provided to a processor of a general purpose computer, special purpose computer, or other programmable data processing device or information handling device to produce a machine, such that the instructions, which execute via a processor of the device implement the functions/acts specified. The program instructions may also be stored in a device readable medium that can direct a device to function in a particular manner, such that the instructions stored in the device readable medium produce an article of manufacture including instructions which implement the function/act specified. The instructions may also be loaded onto a device to cause a series of operational steps to be performed on the device to produce a device implemented process such that the instructions which execute on the device provide processes for implementing the functions/acts specified.

The units/modules/applications herein may include any processor-based or microprocessor-based system including systems using microcontrollers, reduced instruction set computers (RISC), application specific integrated circuits (ASICs), field-programmable gate arrays (FPGAs), logic circuits, and any other circuit or processor capable of executing the functions described herein. Additionally or alternatively, the modules/controllers herein may represent circuit modules that may be implemented as hardware with associated instructions (for example, software stored on a tangible and non-transitory computer readable data storage device, such as a computer hard drive, ROM, RAM, or the like) that perform the operations described herein. The above examples are exemplary only, and are thus not intended to limit in any way the definition and/or meaning of the term "controller." The units/modules/applications herein may execute a set of instructions that are stored in one or more storage elements, in order to process data. The storage elements may also store data or other information as desired or needed. The storage element may be in the form of an information source or a physical memory element within the modules/controllers herein. The set of instructions may include various commands that instruct the modules/applications herein to perform specific operations such as the methods and processes of the various embodiments of the subject matter described herein. The set of instructions may be in the form of a software program. The software may be in various forms such as system software or application software. Further, the software may be in the form of a collection of separate programs or modules, a program module within a larger program or a portion of a program module. The software also may include modular programming in the form of object-oriented programming. The processing of input data by the processing machine may be in response to user commands, or in response to results of previous processing, or in response to a request made by another processing machine.

It is to be understood that the subject matter described herein is not limited in its application to the details of construction and the arrangement of components set forth in the description herein or illustrated in the drawings hereof. The subject matter described herein is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items.

It is to be understood that the above description is intended to be illustrative, and not restrictive. For example, the above-described embodiments (and/or aspects thereof) may be used in combination with each other. In addition, many modifications may be made to adapt a particular situation or material to the teachings herein without departing from its scope. While the dimensions, types of materials and coatings described herein are intended to define various parameters, they are by no means limiting and are illustrative in nature. Many other embodiments will be apparent to those of skill in the art upon reviewing the above description. The scope of the embodiments should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects or order of execution on their acts.

What is claimed is:

1. An augmented reality (AR) system, comprising:

an auxiliary electronic device comprising:

at least one sensor configured to detect an indicator on a physical display screen of a primary electronic device;

an optical system including a light source and at least one lens and configured to generate a virtual display;

a memory to store executable instructions; and one or more processors, when implementing the executable instructions, to:

determine a position of the physical display screen in relation to the auxiliary electronic device based on the indicator detected by the at least one sensor; and generate the virtual display at a determined location related to the physical display screen based on the position of the physical display determined;

wherein the one or more processors are further configured to communicate to the primary electronic device to reduce a light level of the physical display screen while the virtual display at least partially overlaps the physical display screen and in response to operatively coupling the auxiliary electronic device to the primary electronic device such that inputs of the primary electronic device are output by the virtual display of the auxiliary electronic device.

2. The AR system of claim 1, wherein the one or more processors are further configured to:

operatively couple the auxiliary electronic device to the primary electronic device; and communicate to the primary electronic device to display the indicator on the physical display screen in response to operatively coupling the auxiliary electronic device to the primary electronic device.

3. The AR system of claim 1, wherein the at least one sensor is a first sensor, and the auxiliary electronic device includes a second sensor configured to obtain position data related to the auxiliary electronic device; wherein the position data is used to determine the position of the physical display screen in relation to the auxiliary electronic device.

4. The AR system of claim 3, wherein the first sensor is a camera and the second sensor is at least one of an accelerometer or a gyroscope.

5. The AR system of claim 1, wherein the one or more processors are further configured to:

obtain a user profile of a user of the auxiliary electronic device; and determine the position of the physical display screen in relation to the auxiliary electronic device based on settings of the user profile.

6. The AR system of claim 5, wherein to obtain the user profile the one or more processors are further configured to obtain context data related to the user and determine the user profile based on the context data.

7. The AR system of claim 5, wherein the one or more processors are further configured to determine a size or shape of the virtual display based on the settings of the user profile.

8. The AR system of claim 1, wherein the virtual display includes a first virtual display, a second virtual display, and a third virtual display.

9. The AR system of claim 1, wherein the one or more processors are further configured to position the virtual display a determined distance above the physical display screen.

10. The AR system of claim 9, wherein at least three virtual displays are positioned above the physical display screen.

11. An augmented reality (AR) system, comprising:

a primary electronic device having a physical display screen, the primary electronic device comprising:

a memory to store executable instructions; and one or more processors, when implementing the executable instructions, to:

vary a light level of the physical display screen;

display an indicator on the physical display screen; and vary the physical display screen in response to operatively coupling to an auxiliary electronic device that generates a virtual display;

the auxiliary electronic device configured to generate the virtual display and operatively coupled to the primary electronic device such that inputs of the primary electronic device are output by the virtual display of the auxiliary electronic device, the auxiliary electronic device comprising:

at least one sensor configured to detect the indicator on the physical display screen of the primary electronic device;

an optical system configured to generate the virtual display;

a memory to store executable instructions; and one or more processors, when implementing the executable instructions, to:

obtain position data from the at least one sensor related by detecting the indicator on the physical display screen;

determine a position of the physical display screen in relation to the auxiliary electronic device based on the indicator detected by the at least one sensor;

generate the virtual display at a determined location related to the physical display screen based on the position of the physical display determined; and reduce a light level of the physical display screen while the virtual display at least partially overlaps the physical display screen.

12. The AR system of claim 11, wherein the indicator is at least one of a QR code, bar code, symbol, or fiduciary marker.

13. The AR system of claim 11, wherein the one or more processors of the primary electronic device are configured to vary the physical display screen by varying the light level of the physical display screen in response to operatively coupling the primary electronic device and the auxiliary electronic device.

14. The AR system of claim 11, wherein the one or more processors of the primary electronic device are configured to generate the virtual display at the determined location in response to operatively coupling the primary electronic device and the auxiliary electronic device.

15. An augmented reality (AR) system, comprising:

an auxiliary electronic device comprising:

at least one sensor configured to detect an indicator on a physical display screen of a primary electronic device;

an optical system including a light source and at least one lens and configured to generate a virtual display;

wherein the virtual display at least partially overlaps the physical display screen;

a memory to store executable instructions; and one or more processors, when implementing the executable instructions, to:

determine a position of the physical display screen in relation to the auxiliary electronic device based on the indicator detected by the at least one sensor;

generate the virtual display at a determined location related to the physical display screen based on the position of the physical display determined; and communicate with the primary electronic device to reduce a light level of the physical display screen while the virtual display at least partially overlaps.

16. The AR system of claim 15, wherein the one or more processors are further configured to:

operatively couple the auxiliary electronic device to the primary electronic device; and communicate to the primary electronic device to display the indicator on the physical display screen in response to operatively coupling the auxiliary electronic device to the primary electronic device.

17. The AR system of claim 15, wherein the one or more processors are further configured to communicate to the primary electronic device to vary a light level of the physical display screen in response to operatively coupling the auxiliary electronic device to the primary electronic device.

18. The AR system of claim 15, wherein the at least one sensor is a first sensor, and the auxiliary electronic device includes a second sensor configured to obtain position data related to the auxiliary electronic device; wherein the position data is used to determine the position of the physical display screen in relation to the auxiliary electronic device.

19. The AR system of claim 18, wherein the first sensor is a camera and the second sensor is at least one of an accelerometer or a gyroscope.

* * * * *